(12) United States Patent
Tenten

(10) Patent No.: US 7,873,493 B2
(45) Date of Patent: Jan. 18, 2011

(54) METHOD AND DEVICE FOR DETERMINING ANGULAR POSITION

(75) Inventor: Wilfried Tenten, Gammertingen (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 12/287,302

(22) Filed: Oct. 7, 2008

(65) Prior Publication Data

US 2009/0096445 A1 Apr. 16, 2009

(30) Foreign Application Priority Data

Oct. 11, 2007 (DE) .................. 10 2007 048 856

(51) Int. Cl.
G06F 15/00 (2006.01)
G01B 7/30 (2006.01)
(52) U.S. Cl. ..................... 702/151; 318/479
(58) Field of Classification Search ................. 702/151, 702/145; 324/207.12, 207.25; 318/479
See application file for complete search history.

(56) References Cited

U.S. PATENT DOCUMENTS

| 7,571,072 B2 * | 8/2009 | Eldery et al. ................ 702/151 |
| 2002/0173931 A1 * | 11/2002 | Dudler et al. ............... 702/151 |
| 2004/0080290 A1 * | 4/2004 | Hill et al. .................... 318/254 |
| 2005/0242802 A1 * | 11/2005 | Matsumoto et al. ......... 324/174 |

* cited by examiner

*Primary Examiner*—Bryan Bui
(74) *Attorney, Agent, or Firm*—Kenyon & Kenyon LLP

(57) ABSTRACT

A method for determining angular position, which removes a systematic error in the angular position determination and requires a low calculating effort, by determining a first factor and a second factor as a function of an angular position, forming a first product from a first signal and the first factor, and a second product of the second signal and the second factor, forming a subtraction result by the subtraction of the second product from the first product, and comparing the subtraction result to a quantity.

22 Claims, 3 Drawing Sheets

METHOD AND DEVICE FOR DETERMINING ANGULAR POSITION

RELATED APPLICATION INFORMATION

The present application claims priority to and the benefit of German patent application no. 10 2007 048856.6, which was filed in Germany on Oct. 11, 2007, the disclosure of which is incorporated herein by reference.

FIELD OF THE INVENTION

The present invention relates to a method for determining angular position, a device for determining angular position and an angular position sensor.

BACKGROUND INFORMATION

Methods from the related art for determining angular position are based on a plurality of sensors which are situated, offset by a certain angle on a mechanical element, about a rotational axis around which the mechanical element rotates. Each of the sensors records a signal which changes sinusoidally as a function of the angular position. In the case of one widely used measuring method, a so-called dipolar angular position sensor is used, which has two identical sensors that are situated offset by 90°. An angular position $\phi$ is then calculated from a first sensor signal $s_1$ of one of the two sensors and from a second sensor signal $s_2$ of the other of the two sensors, according to the following formula:

$$\varphi = \arctan\frac{s_1}{s_2} \qquad (1)$$

One disadvantage of this method is that the calculation rests on the assumption that the sensor signals are not faulty.

However, this assumption will never be fulfilled, based on inaccuracies during manufacturing, wear and outside influences. Equation 1 does not, however, make it possible to determine these inaccuracies. In addition, one is not able to ascertain the results of the arc tangent function with the aid of a simple evaluation circuit.

SUMMARY OF THE INVENTION

The exemplary embodiments and/or exemplary methods of the present invention is based on the object of creating a method for determining angular position, a device for determining angular position and an angular position sensor which make it possible to remove systematic errors in the determination of angular position and which require a low calculating effort.

The object, on which the exemplary embodiments and/or exemplary methods of the present invention is based, is attained by a method for determining angular position according to the description herein, a device for determining angular position according to the description herein and an angular position sensor according to the description herein.

The exemplary embodiments and/or exemplary methods of the present invention relates to a method for determining angular position having the following steps: determining a first factor and a second factor as a function of an angular position; forming a first product of a first signal and the first factor, and a second product of the second signal and the second factor; forming a subtraction result by the subtraction of the second product from the first product; and comparing the subtraction result to a quantity.

These operations are fortunately able to be implemented by a simple integrated circuit. Therefore, the method is fast and may be applied economically.

In one exemplary embodiment, the method has the following further steps: determining an additional first factor and an additional second factor as a function of an additional angular position; forming an additional first product from the first signal and the additional first factor, and from an additional second product of the second signal and the additional second factor; forming an additional subtraction result by the subtraction of the additional second product from the additional first product; and comparing the additional subtraction result to the quantity.

The additional iterative steps for determining angular position advantageously also exclusively require simple operations.

In one refinement of the exemplary embodiment, an additional angular position is determined by successive approximation in such a way that the difference between the subtraction result and the quantity for the additional angular position is less than the difference between the subtraction result and the quantity for the angular position, in order thus to determine a resulting value for the angular position at a point in time.

Successive approximation is advantageously easy to implement, and leads rapidly to a precise determination of the angular position.

In another exemplary embodiment the quantity is zero.

This quantity is advantageously particularly easy to determine.

In yet another exemplary embodiment, the first signal is obtained by subtraction of a value from a first sinusoidal measuring signal, and the second signal is obtained by subtraction of an additional value from a second sinusoidal measuring signal.

The measuring accuracy may advantageously be increased, since offsets do not influence the measurements.

In yet another exemplary embodiment, the factors correspond to elements of a matrix for the transformation of the coordinates of a vector in a coordinate system having oblique coordinates to the coordinates of the vector in a coordinate system having orthogonal coordinates.

Such elements may advantageously be calculated easily, so that the angular position determination is able to be carried out particularly rapidly.

In one refinement of the exemplary embodiment, the method has the following further steps: determining a following first factor and a following second factor as a function of a following angular position; forming a following first product from a following first signal and the following first factor, and a following second product of the following second signal and the following second factor; forming a following subtraction result by the subtraction of the following second product from the following first product; and comparing the following subtraction result to a following quantity. The following quantity may be identical to the quantity, in this context.

In still another refinement of the exemplary embodiment, the method has the following further steps: determining another following first factor and another following second factor as a function of still another following angular position; forming still another following first product from the following first signal and the following first factor, and still another following second product of the still another following second signal and the following second factor; forming still another following subtraction result by the subtraction of the still another following second product from the still another following first product; and comparing the still another following subtraction result to a following quantity.

In still another refinement, the another following angular position is determined by successive approximation in such a way that the difference between the another following subtraction result and the following quantity for the additional following angular position is less than the difference between the following subtraction result and the following quantity for the following angular position, in order thus to determine a following resulting value for the angular position at a following point in time.

The following resulting value of the angular position may advantageously be determined rapidly and precisely at a short interval in time from the resulting value of the angular position.

In yet one more refinement of the exemplary embodiment, an angular velocity is determined based on the resulting value and the following resulting value and a time difference between the point in time and the following point in time.

An exact instantaneous value of the angular velocity may advantageously be determined based on the rapid angular position determination.

In still another further development of the exemplary embodiments, the difference between the following resulting value and the resulting value is compared to a threshold value, in order to determine whether the angular velocity is zero or not.

A rotational movement is advantageously able to be recorded without the recording being impaired by measuring errors below the threshold value. In addition, a suitable selection of the threshold value will lead to any rotational movement being able to be recorded, since, based on frictional phenomena, speeds, especially rotational speeds, occur only above a threshold value.

The exemplary embodiments and/or exemplary methods of the present invention also relates to a device for determining angular position, having: a factor determination device for determining a first factor and a second factor as a function of an angular position; a product-forming device for forming a first product from a first signal and the first factor, and a second product of the second signal and the second factor; a subtraction device for forming a subtraction result by the subtraction of the second product from the first product; and a comparing device for comparing the subtraction result to a quantity.

The exemplary embodiments and/or exemplary methods of the present invention also relates to an angular position sensor which has a device for determining angular position, having: a factor determination device for determining a first factor and a second factor as a function of an angular position; a product-forming device for forming a first product from a first signal and the first factor and a second product from a second signal and the second factor; a subtraction device for forming a subtraction result by subtracting the second product from the first product; and a comparing device for comparing the subtraction result to a quantity.

The exemplary embodiments and/or exemplary methods of the present invention is described in greater detail below with reference to the drawings.

DETAILED DESCRIPTION

Figure 1:
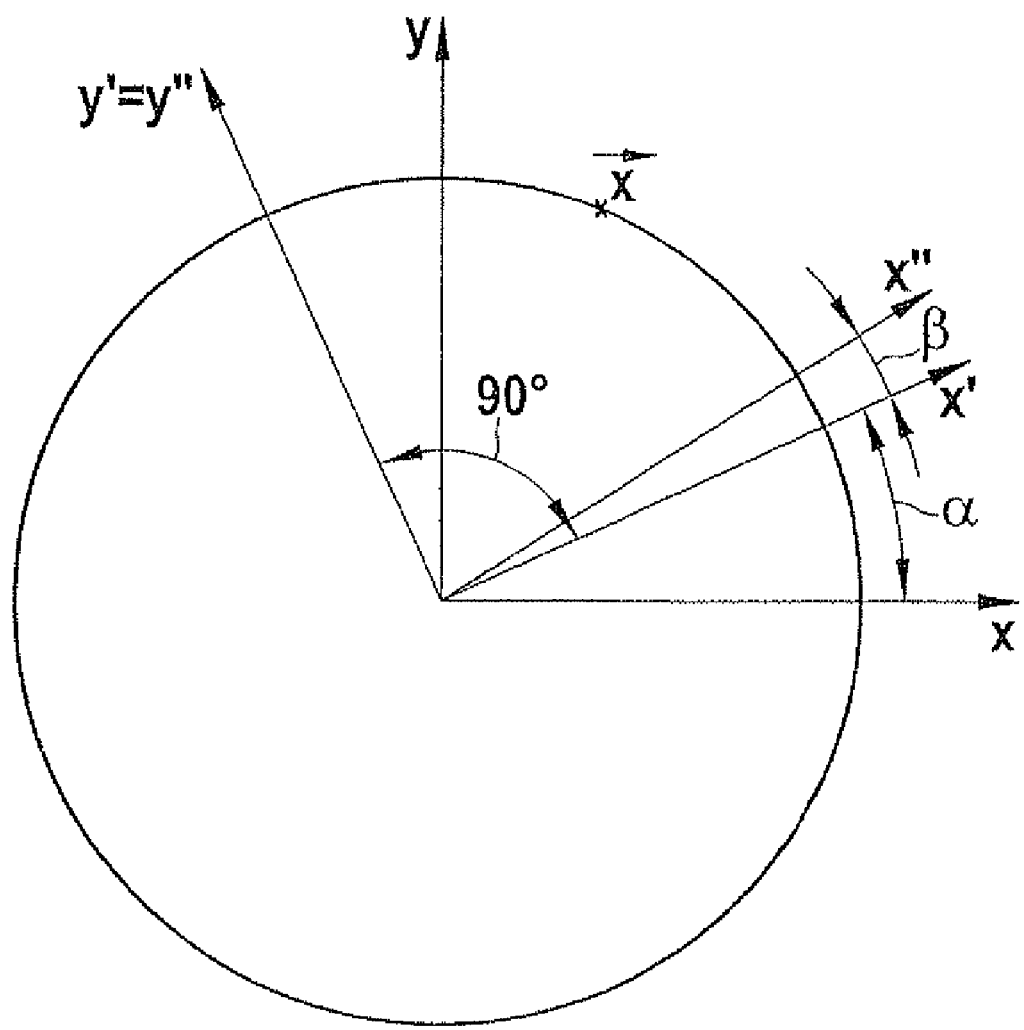
FIG. 1 shows a representation of a vector in three different coordinate systems.

FIG. 1 shows a representation of a vector $\bar{x}$ in three different coordinate systems. A first orthogonal coordinate system has the coordinate axes x and y. A second orthogonal coordinate system has coordinate axes x' and y' and is rotated by an angle $\alpha$ with respect to the first coordinate system. A third oblique coordinate system has the coordinate axes x" and y", coordinate axis y" being identical to coordinate axis y', and coordinate axis x" being rotated by an angle $\beta$ with respect to coordinate axis x'. Coordinate systems x', y' and x", y" rotate relative coordinate system x, y ($\alpha=\alpha(t)$). Coordinates $x_0"$, $y_0"$ of vector $\bar{x}$ in coordinate system x", y" can be transformed into the coordinates $x_0$, $y_0$ of coordinate system x, y with the aid of a transform matrix R:

$$\bar{x} = \begin{pmatrix} x_0 \\ y_0 \end{pmatrix} = \begin{pmatrix} \cos(\alpha+\beta) & -\sin\alpha \\ \sin(\alpha) & \cos(\alpha+\beta) \end{pmatrix} \cdot \begin{pmatrix} x_0'' \\ y_0'' \end{pmatrix} = R \cdot \begin{pmatrix} x_0'' \\ y_0'' \end{pmatrix} \quad (2)$$

The values x", $y_0"$ may be regarded as being measuring signals from two sensors. These measuring signals which, in the ideal case, are sinusoidal and offset with respect to each other by $\Pi/2$, differ from each other in reality by $\Pi/2-\beta$, $\beta$ being a phase shift, because of geometrical deviations of the sensors and signal transfer time differences.

For analysis, measuring signals $x_0"$ and $y_0"$ are calibrated relative to measuring signal $x_0"$ in the phase and are normalized to measuring signal $x_0"$. The measuring signals may then be represented as a measuring signal x" without phase shift and a measuring signal y" with phase shift, as follows:

$$\begin{pmatrix} x'' \\ y'' \end{pmatrix} = \begin{pmatrix} \sin\varphi + ox \\ (1+f) \cdot \cos(\varphi+\beta) + oy) \end{pmatrix} \quad (3)$$

Measuring signals $x_0"$ and $y_0"$ have offsets ox and oy. $\phi$ is the angular position, for which $\phi=\omega \cdot t$ applies, t being the time and $\omega$ being the angular velocity. Factor (1+F) is given by the difference of amplitude $A_x$ of signal x" and amplitude $A_y$ of signal y" ($A_y=(1+f) \cdot A_x$).

By transforming signals $x_0"$ and $y_0"$, signals $x_0$ and $y_0$ are now determined in coordinate system x, y:

$$\bar{x} = \begin{pmatrix} x_0 \\ y_0 \end{pmatrix} \quad (4)$$

$$= R \cdot \begin{pmatrix} x_0'' \\ y_0'' \end{pmatrix}$$

$$= \begin{pmatrix} \cos(\alpha+\beta) & -\sin\alpha \\ \sin(\alpha) & \cos(\alpha+\beta) \end{pmatrix} \cdot \begin{pmatrix} \sin\varphi + ox \\ (1+f) \cdot \cos(\varphi+\beta) + oy \end{pmatrix}$$

$$= \begin{pmatrix} \cos(\alpha+\beta) \cdot (\sin\varphi + ox) - \sin\alpha \cdot ((1+f) \cdot \cos(\varphi+\beta) + oy) \\ \sin(\alpha) \cdot (\sin\varphi + ox) + \cos(\alpha+\beta) \cdot ((1+f) \cdot \cos(\varphi+\beta) + oy) \end{pmatrix}$$

If the offsets ox and oy are removed ahead of time or are not present, and f is ignored, ($y_{mod}=(1+f) \cdot (y"-oy)$, $x_{mod}=(x"-ox)$), then for $x_0$ the following applies:

$$x_0 = \cos(\alpha + \beta) \cdot (\sin\varphi) - \sin\alpha \cdot \cos(\varphi + \beta) \quad (5)$$
$$= \cos(\alpha + \beta) \cdot x_{mod} - \sin\alpha \cdot y_{mod}$$

Simulations have shown that the assumption f=0 has only a slight influence in actuality. If, in addition, $x_0$ is set equal to zero, it follows that $\alpha = \varphi$. Consequently, angular position $\varphi$ may be determined without the influence of phase shift $\beta$.

Figure 2:
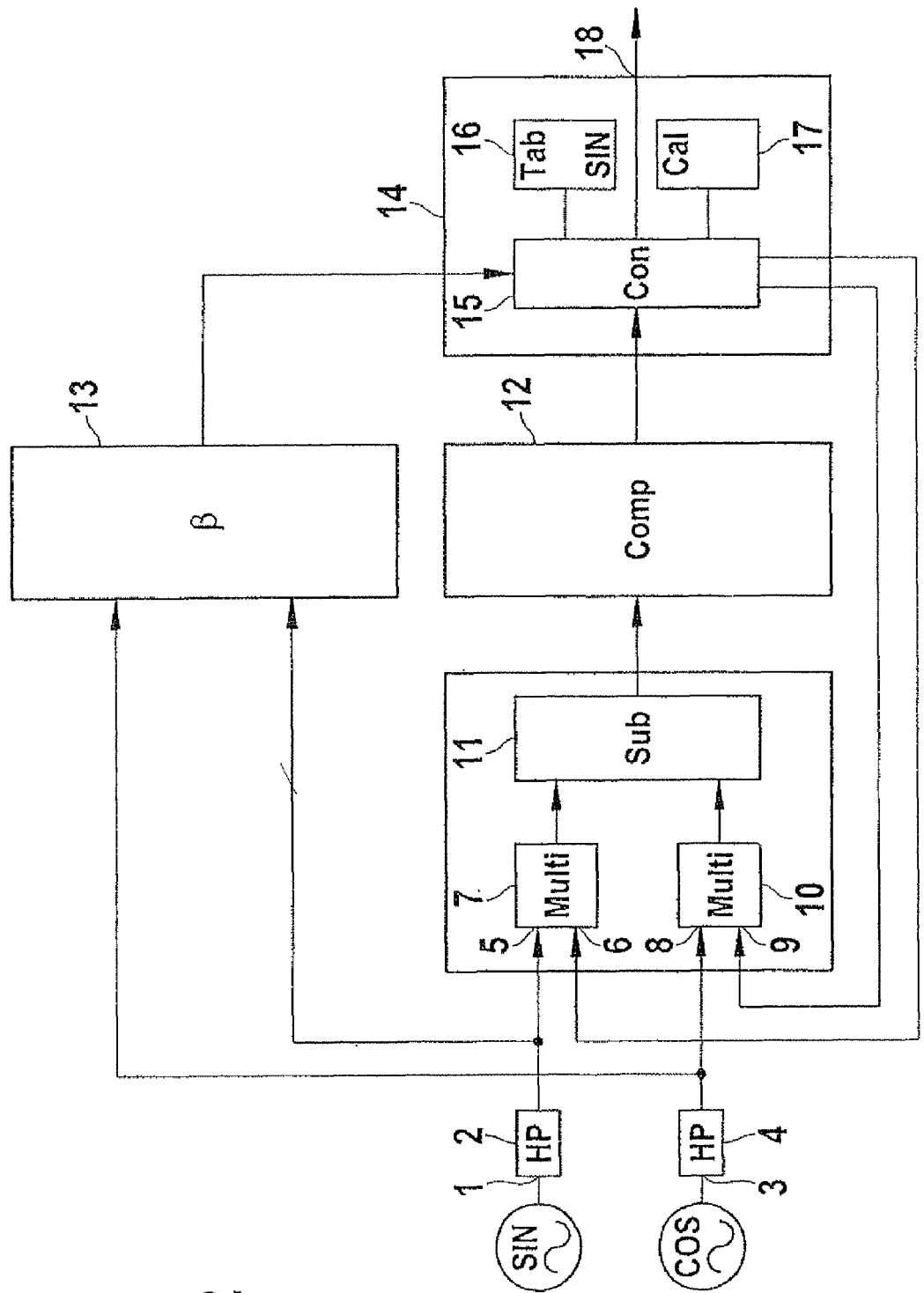
FIG. 2 shows a schematic representation of a device for angular position determination.

FIG. 2 shows a schematic representation of a device for angular position determination. This device, in common with a first sensor and a second sensor (e.g. two coils) mounted on a rotatable mechanical element, and a corresponding detection variable generation device (e.g. a magnet), which is mounted on a stationary mechanical element, forms an angular position sensor. A sine signal x" of a first sensor is supplied to a high-pass filter 2 via a signal input 1. A sine signal y" of a second sensor is supplied to a high-pass filter 4 via a signal input 3. The offsets ox and oy are removed in high-pass filters 2 and 4. If we may assume that the offsets are not present, high-pass filters 2 and 4 may also be omitted. Into the high-pass filters devices may be integrated, in each case, which normalize the amplitudes of sine signal x" and cosine signal y" to the same value. The device for determining the angular position may also have more than two sensors, whose signal are linked to one another and evaluated statistically, in order to achieve greater accuracy.

Filtered sine signal $x_{mod}$ is then supplied to a multiplier 7 via a first signal input 5. At the same time, a first factor signal $F_1$ is supplied to multiplier 7 via a second signal input 6. In multiplier 7, filtered sine signal $x_{mod}$ is first represented digitally, and then digitally represented sine signal $x_{mod}$ and first factor signal $F_1$, which is also represented digitally, are multiplied together, so that a first multiplication signal $M_1$ is created. Filtered cosine signal $y_{mod}$ is then supplied in parallel to a multiplier 10 via a first signal input 8. At the same time, a second factor signal $F_2$, which is also represented digitally, is supplied to multiplier 10 via a second signal input 9. In multiplier 10, filtered cosine signal $y_{mod}$ is first represented digitally, and then digitally represented cosine signal $y_{mod}$ and second factor signal $F_2$ are multiplied together, so that a second multiplication signal $M_2$ is created.

The two multiplication signals $M_1$ and $M_2$ are then supplied to a subtractor 11. In subtractor 11, second multiplication signal $M_2$ is subtracted from first multiplication signal $M_1$, so that a subtraction signal S is created. This subtraction signal S corresponds to $x_0$ if $F_1 = \cos(\alpha+\beta)$ and $F_2 = \sin(\alpha)$ apply.

Subtraction signal S is supplied to a comparator 12, which determines whether subtractions signal S has a positive or a negative value, that is, greater than zero or less than zero, and based on this comparison, generates a comparison signal V having digital values 0 or 1, which is transmitted to a factor determination device 14. The value 0 means that subtraction signal S is less than 0, and the value 1 means that subtraction signal S is greater than the value 0.

Filtered sine signal $x_{mod}$ and filtered cosine signal $y_{mod}$ are also supplied to a phase analysis device 13, which determines phase shift $\beta$, for instance, from the relative position of the maxima of filtered sine signal $x_{mod}$ and filtered cosine signal $y_{mod}$. Phase shift $\beta$ is also supplied in digital form to factor determination device 14.

In factor determination device 14, first factor signal $F_1$ and second factor signal $F_2$ are determined so that the first factor signal corresponds to $F_1 = \cos(\alpha+\beta) = \sin(\alpha+\beta+\Pi/2)$ and the second factor signal corresponds to $F_2 = \sin(\alpha)$. For, in that case, $\alpha = \varphi$, and angular position $\varphi$ can be determined without phase shift.

Figure 3:
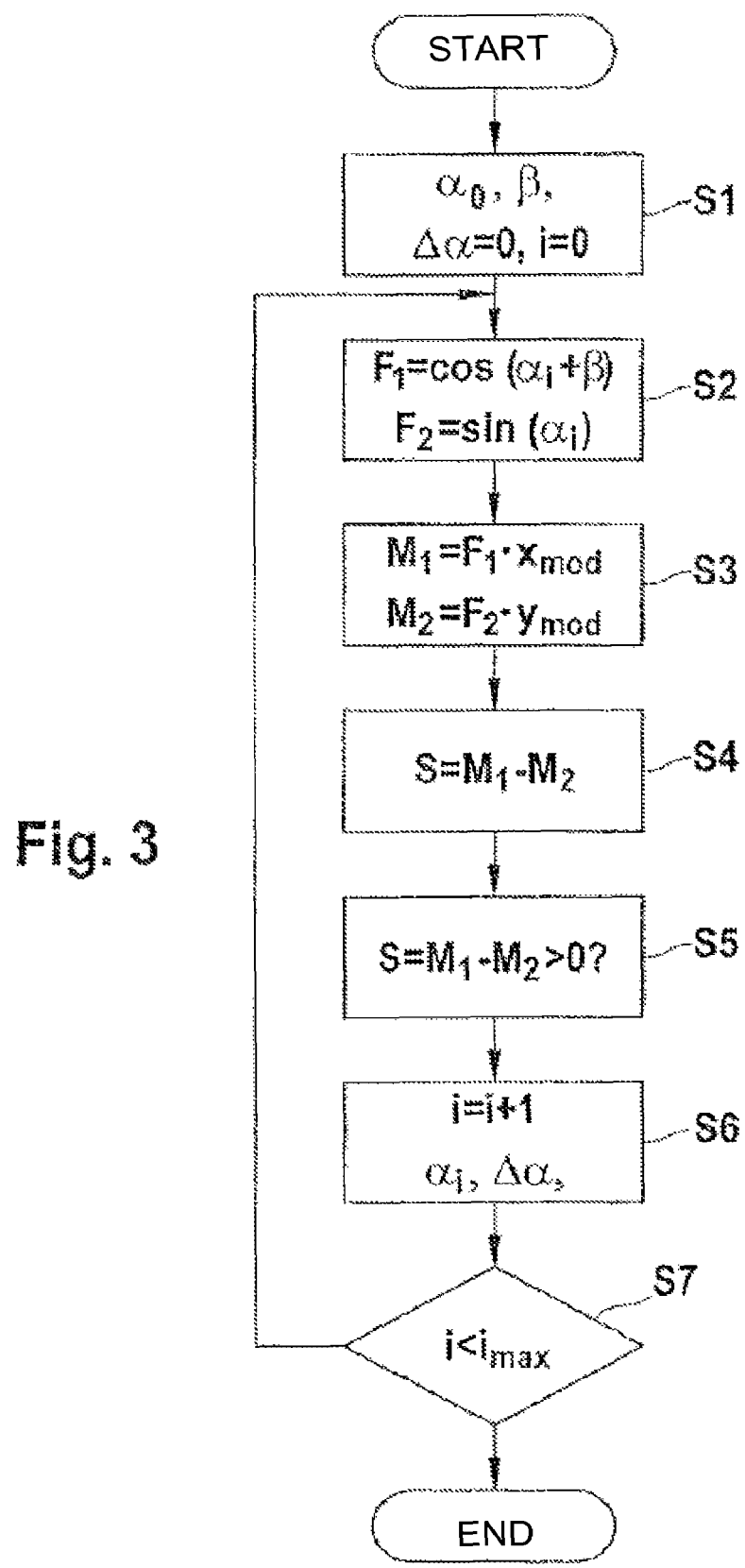
FIG. 3 shows a flow chart of a method for angular position determination.

The method for angular position determination is illustrated in the flow chart in FIG. 3. For the determination of the two factor signals $F_1$ and $F_2$, a calculating unit 17 establishes an initial starting value $\alpha_0$, which is equivalent to a digital value (step S1).

Beginning at this starting value, calculating unit 17 calculates the two angles $\alpha_0+\beta+\Pi/2$ and $\alpha_0+\beta$. For the two angles $\alpha_0+\beta+\Pi/2$ and $\alpha_0+\beta$, calculating unit 17 first determines, with the aid of symmetry considerations for the sinus function, two angles $\alpha_0'$ and $\alpha_0''$, which lie in a quadrant 0 to $\Pi/2$, and for which the following equations apply:

$$\sin(\alpha_0') = |\sin(\alpha_0+\beta+\Pi/2)| \quad (6)$$

$$\sin(\alpha_0'') = |\sin(\alpha_0)| \quad (7)$$

Then, from a memory 16, having values in tabular form, calculating unit 17 reads the sine function values $\sin(\alpha_0'')$ and $\sin(\alpha_0')$ in a quadrant 0 to $\Pi/2$. The sine function values are stored in memory 16 at a precision of $2^{13}$ bits, that is, $2\Pi$ corresponds to the binary number $2^{13}$. Accordingly, $\Pi/2$ corresponds to the binary number $2^{11}$. Access to memory 16 takes place via a control 15. Control 15 also takes care of the communication between the inputs and the outputs of factor determination device 14. Calculating unit 17 multiplies the sine function values $\sin(\alpha_0'')$ and $\sin(\alpha_0')$, or one of sine function values $\sin(\alpha_0-)$ and $\sin(\alpha_0')$, by $-1$, if necessary, in order to obtain the two factor signal $F_1 = \cos(\alpha_0+\beta)$ and $F_2 = \sin(\alpha_0)$ (Step S2).

The two factor signals $F_1 = \cos(\alpha_0+\beta)$ and $F_2 = \sin(\alpha_0)$ are now passed on to the two multipliers 7 and 10 by factor determination device 14. Multipliers 7 and 10 now calculate, by multiplication by signals $x_{mod}$ and $y_{mod}$, as described above, first multiplication signal $M_1 = \cos(\alpha_0+\beta) \cdot x_{mod}$ and second multiplication signal $M_2 = \sin(\alpha_0) \cdot y_{mod}$ (Step S3).

Subtractor 11 then forms subtraction signal S from first multiplication signal M1 and multiplication signal $M_2$, as described above (Step S4).

Comparator 12 then determines, as described above, whether the subtraction signal is greater than, or less than zero, and based on this comparison it generates comparison signal V (Step S5).

The calculating unit now determines an additional value $\alpha_1$, for which $\alpha_1 = \alpha_0 \pm \Delta\alpha$ applies, where $\Delta\alpha$ is a digital value of a specified angle, and the sign $\pm$ depends on the comparison signal (Step 6). The sign $\pm$ is selected so that the absolute value of S decreases with each iteration.

Analogously to the case $\alpha_0$, the calculating unit executes Steps S2 to S6 for $\alpha_1$. In this way, iteratively successive $\alpha_{i+1} = \alpha_0 \pm \Delta\alpha$ are determined by successive approximation, the specified value $\Delta\alpha$ being halved for each iteration. This halving corresponds to shifting a binary number by one place. The number of iterations, in this context, depends on the desired accuracy in the representation of $\alpha_1$, which is limited by the accuracy of the tabular-form representation of the sine function, a binary place of $\alpha_1$ being determined at each iteration. When the lowest binary place has been determined ($i = i_{max}$), the method stops (Step 7). The resulting value $\sigma_1$ for the angular position $\alpha_i$ for $i = i_{max}$, which may deviate at most by an absolute value of $\alpha$, which is given by $\Delta\alpha$ for $i = i_{max}$, is output at signal output 18. The method is then carried out anew, in order to determine an additional resulting value $\sigma_{i+1}$ for the angular position at a later time. Resulting values $\sigma_i$ of the angular position are supplied to an evaluation circuit (that is not shown).

During the execution of an iteration, factor signals $F_1$ and $F_2$ are always multiplied by the same sine signal $x_{mod}$ or cosine signal $y_{mod}$. In order to achieve this, sine signal $x_{mod}$ or cosine signal $y_{mod}$ is scanned at a slower clock pulse at signal inputs 5, 8 than factor signals $F_1$ and $F_2$ at signal inputs 6 and 9. The scanning clock pulse at which sine signal $x_{mod}$ and cosine signal $y_{mod}$ are scanned is set in such a way that the successive approximation is able to be carried out completely during scanning clock pulse duration T. For the following iteration, resulting value $\sigma_{i+1}$ states angular position $\alpha$ for a time that is a scanning clock pulse duration T after the time for which $\sigma_i$ was determined.

In one application, the evaluation circuit calculates angular velocity $\omega=(\sigma_{i+1}-\sigma_i)/T$, in each case from two successively output resulting values $\sigma_i$ and $\sigma_{i+1}$ of angular position $\alpha$ and from scanning clock pulse duration T at which sine signal $x_{mod}$ and cosine signal $y_{mod}$ are being scanned. In the case in which the angular position sensor is mounted, for instance, on a wheel of a motor vehicle, the evaluation circuit optionally determines a forward speed v of the motor vehicle from $v=\omega \cdot r$, where r is the radius of the motor vehicle wheel. With the aid of the sign of the difference $(\sigma_{i+1}-\sigma_i)$, the evaluation circuit detects the direction of rotation, and consequently also whether the motor vehicle is traveling backwards or forwards.

In one additional application, the evaluation circuit compares the difference $(\sigma_{i+1}-\sigma_i)$ which, as the difference of two digital values itself, corresponds to a digital value, (or the absolute value of the difference $(\sigma_{i+1}-\sigma_i)$) to a digital threshold value. If the difference $(\sigma_{i+1}-\sigma_i)$, (or the absolute amount of the difference $(\sigma_{i+1}-\sigma_i)$), on the one hand, is less than the threshold value, this means that the angular velocity $\omega=0$. If the difference $(\sigma_{i+1}-\sigma_i)$, (or the absolute amount of the difference $(\sigma_{i+1}-\sigma_i)$), on the other hand, is greater than the threshold value, this means that the angular velocity $\omega \neq 0$. The threshold value is selected so that it is at least as great as the accuracy with which angle $\alpha$ is determined by successive approximation.

What is claimed is:

1. A method for determining a resulting value for an angular position, the method comprising:
    circuitry performing the following:
        determining a first factor and a second factor as a function of an initial angular position value;
        forming a first product from a first signal of a first sensor and the first factor and a second product from a second signal of a second sensor and the second factor;
        forming a subtraction result by subtracting the second product from the first product;
        comparing the subtraction result to a predetermined quantity;
        determining an additional first factor and an additional second factor as a function of an additional angular position, the additional angular position selected based on the comparison;
        forming an additional first product from the first signal and the additional first factor and an additional second product from the second signal and the additional second factor;
        forming an additional subtraction result by subtracting the additional second product from the additional first product;
        comparing the additional subtraction result to the predetermined quantity; and
        determining a resulting value for a first angular position based on the comparison of the additional subtraction result to the predetermined quantity.

2. The method of claim 1, wherein the additional angular position is determined by successive approximation so that the difference between the additional subtraction result and the predetermined quantity for the additional angular position is less than the difference between the subtraction result and the predetermined quantity for the angular position, so as to determine a resulting value for the angular position at a point in time.

3. The method of claim 2, wherein the predetermined quantity is zero.

4. The method of claim 2, wherein the first signal is obtained by subtracting a value from a first sinusoidal measuring signal, and wherein the second signal is obtained by subtracting an additional value from a second sinusoidal measuring signal.

5. The method of claim 2, wherein the factors correspond to elements of a matrix for the transformation of coordinates of a vector in a coordinate system having oblique coordinates to coordinates of the vector in a coordinate system having orthogonal coordinates.

6. The method of claim 2, further comprising:
    determining a following first factor and a following second factor as a function of an initial following angular position;
    forming a following first product from a following first signal and the following first factor and a following second product from a following second signal and the following second factor;
    forming a following subtraction result by subtracting the following second product from the following first product;
    comparing the following subtraction result to the predetermined quantity; and
    refining the initial following angular position based on the comparison of the following subtraction result to the quantity to obtain a refined following angular position.

7. The method of claim 6, further comprising:
    determining another following first factor and another following second factor as a function of the refined following angular position;
    forming another following first product from the following first signal and the another following first factor, and another following second product from the following second signal and the another following second factor;
    forming another following subtraction result by subtracting the another following second product from the another following first product;
    comparing the another following subtraction result to the predetermined quantity; and
    determining a resulting value for the following angular position based on the comparison of the another following subtraction result to the predetermined quantity.

8. The method of claim 7, wherein:
    the refined following angular position is determined by successive approximation so that the difference between the another following subtraction result and the predetermined quantity for the refined following angular position is less than the difference between the following subtraction result and the following quantity for the following angular position; and
    the following angular position corresponds to a point in time following a first point in time to which the first angular position corresponds.

9. The method of claim 8, wherein an angular velocity is determined based on the resulting value for the first angular position and the resulting value for the following angular position and a difference between the first point in time and the following point in time.

10. The method of claim 8, wherein a difference between the resulting value for the following angular position and the resulting value for the first angular position is compared to a threshold value, so as to determine whether the angular velocity is zero.

11. A device for determining a resulting value for an angular position, the device comprising:
   a factor determination device to determine a first factor and a second factor as a function of an initial angular position value;
   a product-forming device to form a first product from a first signal and the first factor, and a second product from the second signal and the second factor;
   a subtraction device for forming a subtraction result by subtracting the second product from the first product;
   a comparison device to compare the subtraction result to a predetermined quantity; and
   a refinement device to refine the initial angular position based on a result of the comparison to obtain an additional angular position;
   wherein:
      the factor determination device determines an additional first factor and an additional second factor as a function of the additional angular position;
      the product-forming device forms an additional first product from the first signal and the additional first factor and additional second product from the second signal and the additional second factor;
      the subtraction device forms an additional subtraction result by subtracting the additional second product from the additional first product;
      the comparison device compares the additional subtraction result to the predetermined quantity; and
      the refinements device determines a resulting value for a first angular position based on the comparison of the additional subtraction result to the predetermined quantity.

12. A method for determining a refined value of an angular position, the method comprising:
   obtaining a first signal and a second signal using a sensor system; and
   iteratively performing the following process by circuitry:
      determine a first factor and a second factor as a function of a value of the angular position;
      obtain a first product of the first signal and the first factor;
      obtain a second product of the second signal and the second factor;
      obtain a difference between the first and second products; and
      refine the value of the angular position based on the obtained difference;
   wherein the iterative process is performed until the value of the angular position is refined to a predetermined degree of refinement.

13. The method of claim 12, wherein, in each of the iterations, the value of the angular position is refined by either adding to the value of the angular position or subtracting from the value of the angular position a modification value.

14. The method of claim 13, wherein the modification value is halved after each of the iterations.

15. The method of claim 14, wherein, in each respective iteration, the refinement includes selecting whether to add the modification value to, or subtract the modification value from, the value of the angular position, such that an absolute value of the difference that would be obtained if a subsequent iteration would be performed would be less than an absolute value of the difference obtained in the respective iteration.

16. The method of claim 13, wherein, for each of the iterations:
   the iteration further includes comparing the difference to a predetermined quantity; and
   the refinement includes determining whether to add the modification value to the value of the angular position or to subtract the modification value from the value of the angular position based on the comparison.

17. The method of claim 16, wherein, in each iteration:
   the respective difference is obtained by subtracting the second product from the first product;
   the respective comparison indicates whether the respective obtained difference is positive or negative.

18. The method of claim 17, wherein the predetermined quantity is zero.

19. The method of claim 18, wherein for iteration other than a first iteration, an absolute value of the difference that is obtained for the respective iteration is less than an absolute value of the difference obtained in the iteration immediately preceding the respective iteration.

20. The method of claim 12, wherein, for each of the iterations:
   the iteration further includes comparing the difference to a predetermined quantity; and
   the refinement of the value is in accordance with the comparison.

21. The method of claim 12, wherein the sensor system includes a first sensor via which the first signal is obtained and a second sensor via which the second signal is obtained.

22. The method of claim 21, wherein each of the first and second sensors includes a coil mounted on a rotatable mechanical element, and the sensor system further includes a magnet mounted on a stationary mechanical element.

* * * * *